United States Patent Office 3,144,498
Patented Aug. 11, 1964

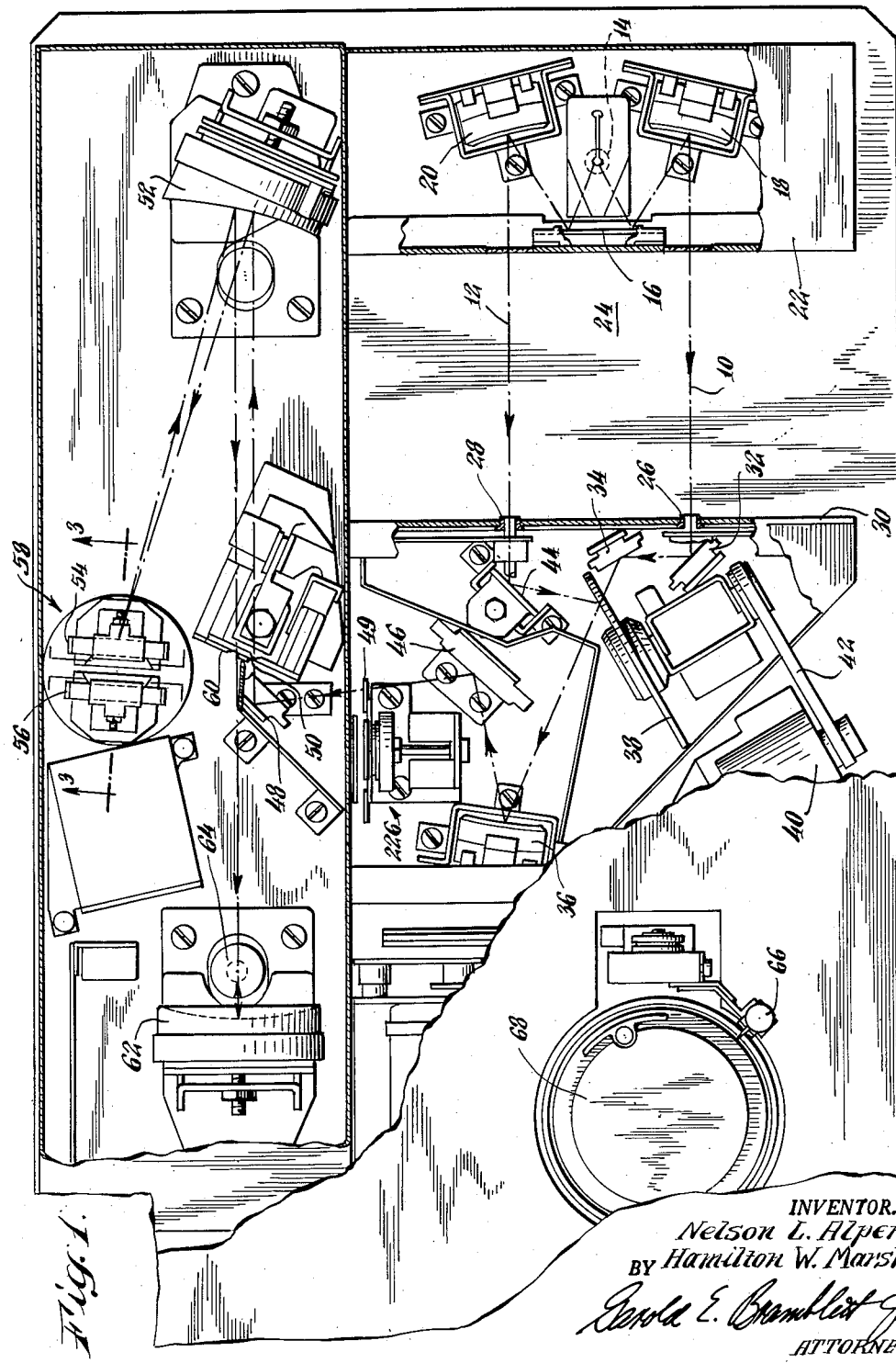

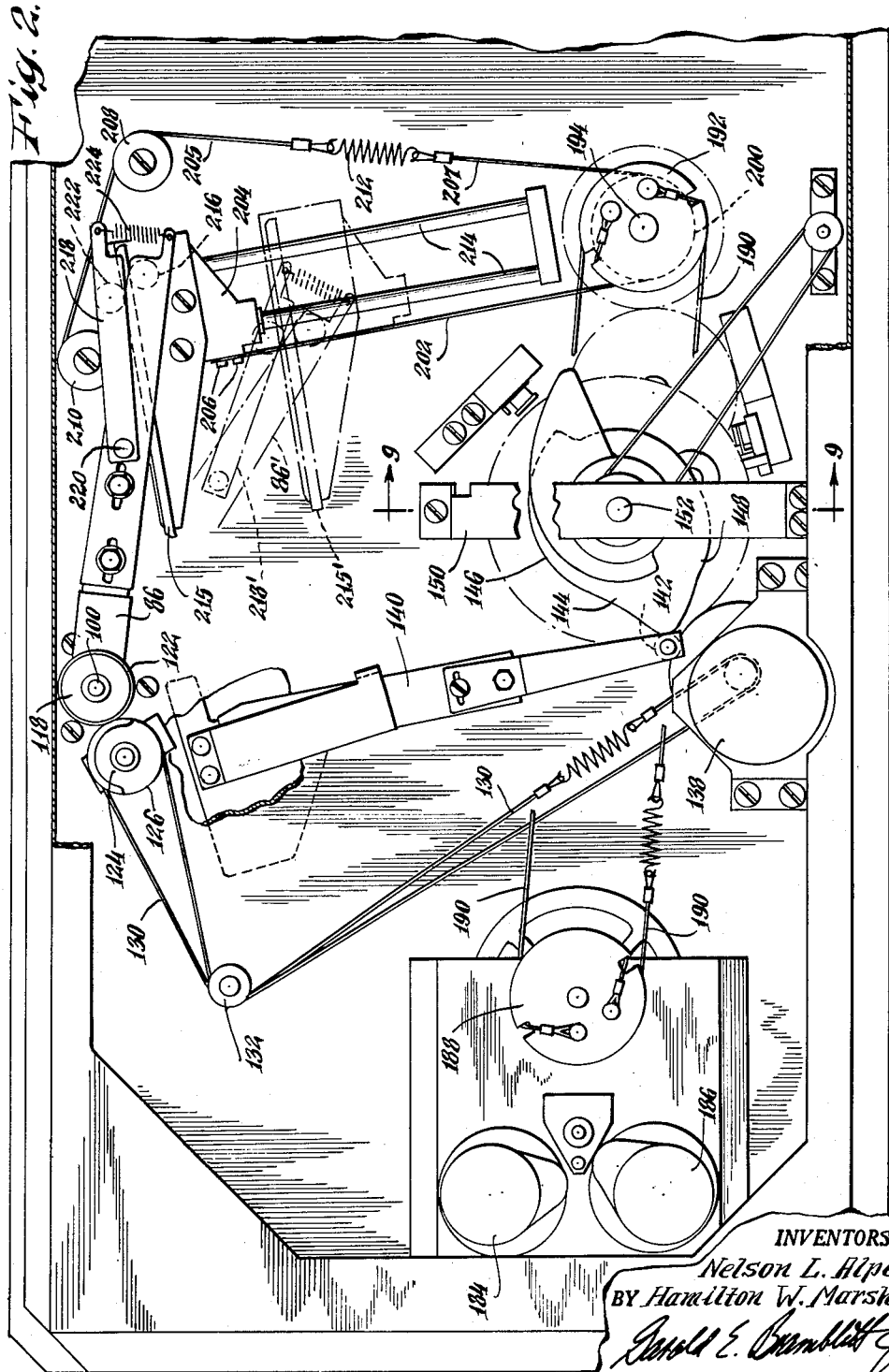

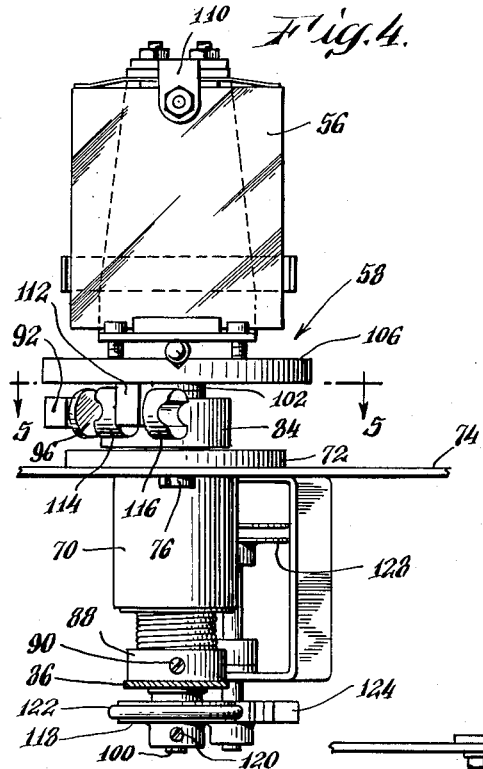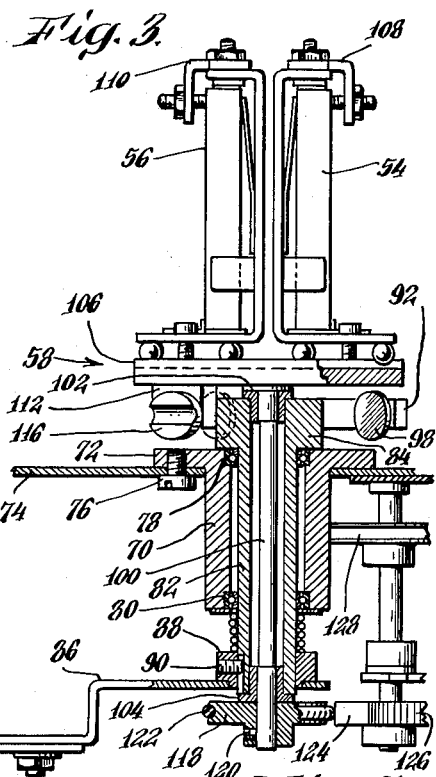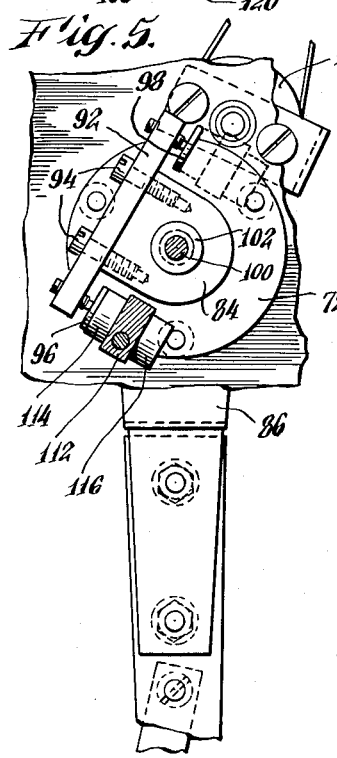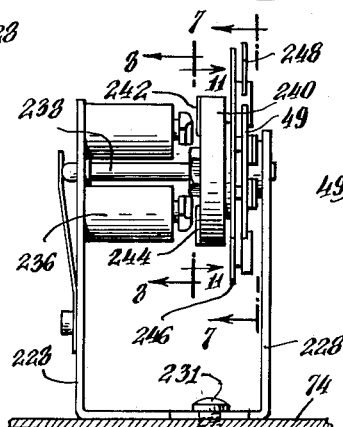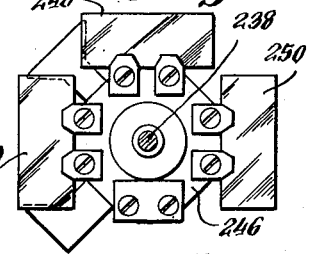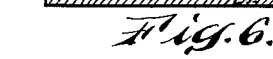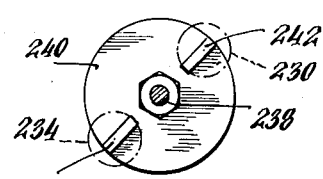

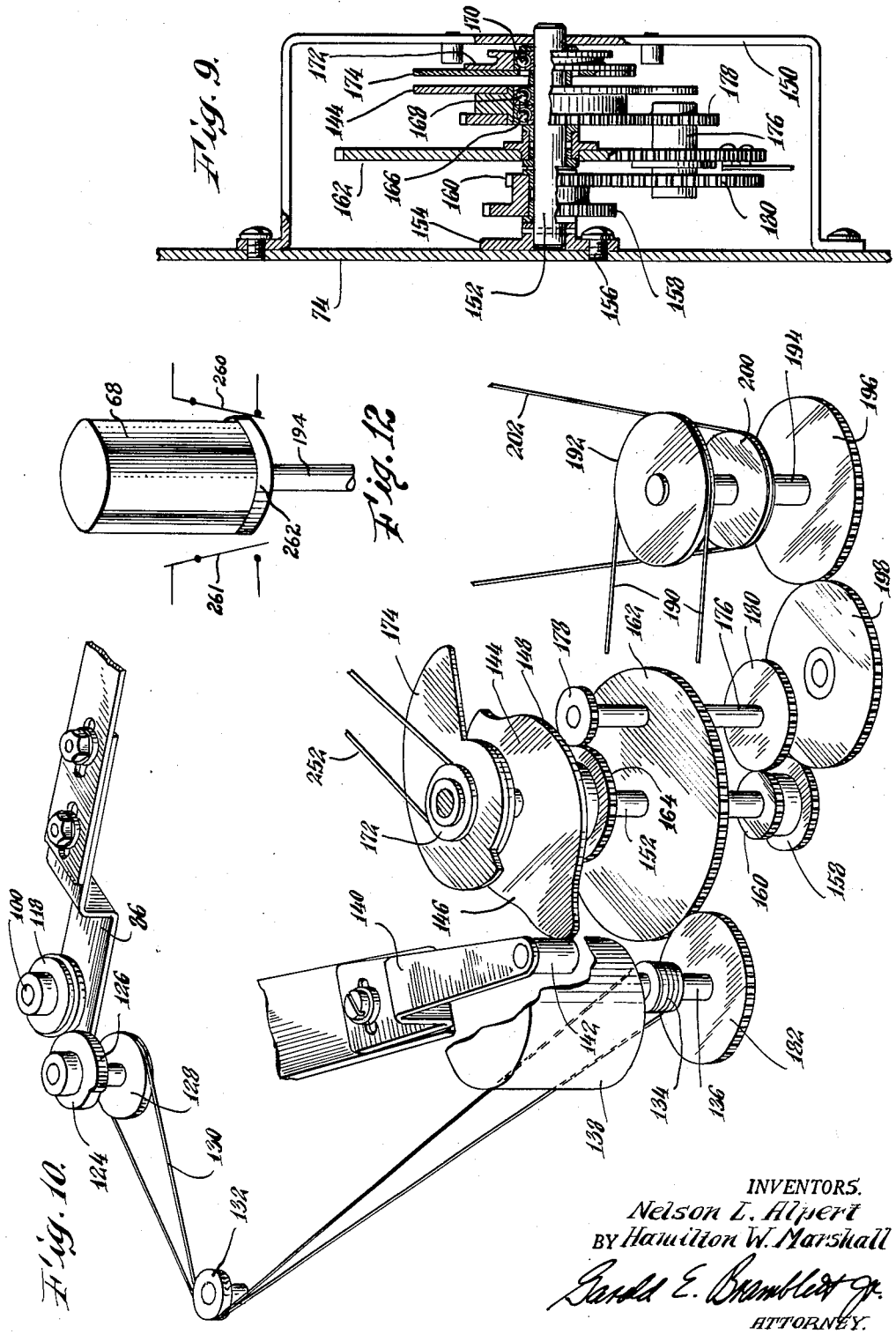

3,144,498
HIGH RESOLUTION FILTER-GRATING
SPECTROMETER
Nelson L. Alpert, Stamford, and Hamilton W. Marshall, Wilton, Conn., assignors to The Perkin-Elmer Corporation, Norwalk, Conn., a corporation of New York
Filed Feb. 23, 1961, Ser. No. 91,113
11 Claims. (Cl. 88—14)

This invention relates to an improved spectrophotometer and, more particularly, to an improved grating spectrophotometer.

It is often desirable in the spectrographic art to utilize optical diffraction gratings, rather than prisms, for dispersing radiant energy such as infrared radiation. Some of the advantages of reflection diffraction gratings over prisms are as follows:

(1) The dispersion of gratings is generally superior to that of prisms;

(2) Diffraction gratings can be used over wide wavelength ranges, as they are not limited by absorption phenomena;

(3) The effect of temperature change is very small for a grating as compared to a prism.

In order to prevent interference from unwanted orders, it is well-known that gratings may be utilized in combination with either a fore-prism monochromator or suitable filters. Of these two alternatives, the latter is often preferred for the following reasons:

(1) A whole monochromator unit may be replaced by one or more filters, thereby avoiding tracking and synchronizing problems;

(2) Both prisms and gratings cause some polarization of the incident radiation. As the combination of a prism and a grating is scanned, there is generally a range over which the planes of polarization partially cross, making such a system somewhat inefficient;

(3) One complete set of slits (that of the fore-prism monochromator) is eliminated;

(4) A prism introduces much stronger image curvature effects than does the grating. A filter introduces none so that only the relatively small curvature due to the grating need be considered;

(5) Cost is lower because of the overall simplicity;

(6) Almost all prisms usable in the infrared are hygroscopic;

(7) There is a significant simplification of the problems involved in extending the wavelength range.

Further, as a general rule, in the infrared region of the spectrum it is possible to obtain filters such that only two are required to cover the first order of any given grating.

Gratings are customarily designed to operate over a specific range of frequencies and are "blazed" for optimum energy diffraction in a given direction. In general, a grating is useful between .5$f$ and 1.5$f$ in the first order where $f$ is the blaze angle frequency.

For maximum utility it may often be desirable to provide a spectrophotometer adapted to utilize more than one grating. This permits covering a broad spectral region with a relatively simple design that yields high reliability and accuracy. However, in prior art instruments, the change from one grating to another has proved to be a problem. For example, in manually removing one grating and installing another, a considerable delay must occur. Further, an alignment problem exists in mounting the new grating and there is always the risk of damage to the grating.

As pointed out supra, filters may be conveniently used to eliminate interfering orders. The problem which accompanies the use of filters with gratings is that more than one filter is customarily required and each must be inserted in the beam over the proper spectral range. Another problem that accompanies the use of multiple gratings is that a slit program suitable for one grating will generally not be suitable for another.

It is, therefore, the primary object of this invention to provide an improved grating spectrophotometer.

Other objects are to provide such a spectrophotometer wherein suitable gratings may be easily selectively positioned in the radiation beam; wherein each selected grating may be rotated through its scanning angle by the same mechanism; wherein suitable filters are easily inserted into the radiation beam; and wherein the slit program is properly controlled for each grating.

The manner in which the above objects are achieved will be apparent from the following description, appended claims, and the figures of the attached drawings wherein:

FIG. 1 is a plan view of a double beam infrared spectrophotometer embodying the invention, portions of the cabinet being cut away to show the optical layout;

FIG. 2 is a bottom view of the instrument of FIG. 1;

FIG. 3 is a side elevation detail of the grating selection unit of the invention, taken along line 3—3 of FIG. 1;

FIG. 4 is a front view of the unit of FIG. 3;

FIG. 5 is a plan view taken along 5—5 of FIG. 4;

FIG. 6 is a side elevation detail of the filter wheel unit of the invention;

FIG. 7 is a front view of the filter wheel taken along line 7—7 of FIG. 6;

FIG. 8 is a cross-section along line 8—8 of FIG. 6, showing the stator pole faces of the filter wheel unit;

FIG. 9 is a cross-section along 9—9 of FIG. 2, showing the gear train controlling wavelength scan, slit program, and range change;

FIG. 10 is a schematic representation of the gear train of FIG. 9;

FIG. 11 is a cross-section taken along 11—11 of FIG. 6; and

FIG. 12 is a schematic representation of a portion of the present invention.

In accordance with the invention, a spectrophotometer is provided with a monochromator having an entrance slit for receiving a radiation beam, a collimator for collimating the radiation from the entrance slit, a plurality of optical gratings mounted for selective positioning in the collimated beam and an exit slit positioned to receive selected wavelengths from each grating.

In the double beam spectrophotometer illustrated in FIG. 1, it will be seen that a sample beam 10 and a reference beam 12 of infrared radiation are formed of radiation emitted by source 14. These beams are formed by the "source optics" comprising plane mirror 16 and toroidal focusing mirrors 18 and 20. The sample and reference beams leave the housing 22 containing the source optics, pass through the exposed sample area 24, and re-enter the instrument through apertures 26, 28 in housing 30 where first images of the source 14 are formed by mirrors 18 and 20 just within housing 30. At these image points, an optical attenuator (not shown) is inserted in each beam.

After entering housing 30, beam 10 is redirected, by means of plane mirrors 32, 34 toward focusing mirror 36. Positioned between plane mirror 34 and focusing mirror 36 is a "chopper" comprising a semicircular disc mirror 38 mounted to be rotatably driven by a motor 40 and belt 42. A plane mirror 44 is positioned in reference beam 12 to direct the beam at an angle toward chopper 38 such that, upon reflection, it follows the same path as the beam leaving mirror 34. As chopper 38 rotates, it will be seen that sample beam 10 and reference beam 12 are alternately directed to mirror 36.

Mirror 36 redirects the beam to plane mirror 46, plane mirror 48, and to the entrance slit 50 of the monochromator. Mirror 36 also refocuses the beam to form a second image of source 14 at monochromator entrance slit 50. In passing between mirrors 46 and 48, the beam passes through a suitable filter 49. The manner in which the filter is positioned in the beam will be described in greater detail infra.

From entrance slit 50, the beam passes to a collimating reflector 52 which collimates the radiation and directs it onto the surface of a diffraction grating 54 which is mounted back to back with a grating 56 in a rotatable mounting 58. The diffracted radiation leaving the surface of grating 54 is redirected by mirror 52 to form an image at monochromator exit slit 60.

The radiation from monochromator exist slit 60 is refocused by an ellipsoidal mirror 62 onto a thermocouple 64. Assuming that at a given wavelength, some radiation is being absorbed by the sample from the sample beam, the output of the thermocouple will fluctuate at the chopper frequency. This "error signal" is used to move the optical attenuator into the reference beam 12 to achieve a null balance. The displacement of the attenuator actuates a recorder pen 66 which is mounted alongside a cylindrical chart drum 68.

*Grating Mount*

The construction of the dual grating mount 58 is shown in detail in FIGS. 3–5. A suitable cylindrical bearing sleeve 70, having a mounting rim 72 is mounted through a hole in instrument base 74 by mounting bolts 76. The bore of sleeve 70 contains two sets of ball bearings 78 and 80. Rotatably retained within these bearings is a cylindrical member 82 having a lip 84 at its upper end to retain it in position. The lower end of member 82 is secured to scan control arm 86 by a suitable collar 88 and screw 90. Lip 84 of member 82 carries a bracket 92 affixed by means of screws 94 (FIG. 5). At each end of bracket 92 is a magnetically permeable disc 96, 98. It will be apparent that movement of control arm 86 is directly transmitted to bracket 92 carrying discs 96, 98.

Positioned within cylindrical member 82 is a shaft 100 which is rotatable within member 82 in sleeve bearings 102, 104. Affixed to the upper end of shaft 100 is a circular table 106. Mounted on table 106 are suitable grating clamps 108, 110 for retaining gratings 54, 56 in back to back relationship. On the underside of table 106 is a magnet bracket 112 which carries two oppositely facing permanent magnets 114, 116 aligned with discs 96, 98.

At the lower end of shaft 100 is a range-change disc 118 secured to the shaft by means of a screw 120. Around the rim of disc 118 is a rubber O-ring 122.

*Range-Change Mechanism*

Positioned alongside disc 118 is a sector wheel 124 having a knurled rim 126 spanning an arc of slightly less than 180°. The sector wheel is so positioned that, on rotation, the knurled rim 126 comes into contact with the O-ring 122 and drives range-change disc 118.

Sector wheel 124 is driven by a pulley 128 (FIG. 10) mounted on the same shaft. Pulley 128 carries a drive cable 130 which passes around a sheave 132 to a drive pulley 134 mounted on the shaft 136 of range-change motor 138.

*Slit Program Changing Mechanism*

The entrance and exit slits of the monochromator are constructed in accordance with the disclosure of U.S. patent application Serial No. 673,088 of Hamilton W. Marshall, filed July 19, 1957 (now Patent 2,987,958) and assigned to the same assignee as the present invention. The proper adjustment of the slits is effected by means of a pivoted slit control arm 140 (FIG. 10) carrying a cam rider 142 which is displaced in accordance with the rotational position of a double-faced slit program cam 144. Cam 144 carries one program profile 146 for one grating and another program profile 148 for the other grating.

The apparatus for transferring between the slit program of cam profile 146 and that of cam profile 148 will be apparent from a consideration of FIGS. 9 and 10 which illustrate in detail the gear train and cams contained within bracket 150 of FIG. 2. Bracket 150 carries the end of a shaft 152 which is also positioned in a collar 154 secured to instrument base 74 by means of screws 156. Spur gears 158, 160 are fixed to shaft 152 while gears 162 and 164 are rotatably mounted thereon. Affixed to spur gear 164 is slit program cam 144—this combination of gear and cam being mounted on ball bearings 166, 168. Also mounted on a ball bearing 170 at the end of the shaft 152 is a combination of a pulley 172 and a slit-override cam 174.

Gear 162 carries an off-center shaft 176 which is rotatable with respect to gear 162 and carries planetary gears 178, 180 affixed to either end. Gear 178 meshes with gear 164 and gear 180 meshes with gear 160. Gear 162, in turn, is driven by motor 138 through gear 182 on shaft 136.

*Scan Drive Mechanism*

The scan drive is powered from either a fast scan motor 184 (FIG. 2) or a slow scan motor 186 by means of a drive pulley 188 and cable 190. Cable 190 drives a pulley 192 (FIG. 10) which is mounted on chart drum shaft 194. Chart drum shaft 194 operates the split program cam 144 by means of gear train 196, 198, 158, 160, 180, 178, and 164.

The grating scan is driven by shaft 194 and pulley 200 by means of a metal tape 202 controlling a sine bar mechanism illustrated in FIG. 2. Tape 202 wraps around pulley 192 and is secured to a slideable carriage 204 by means of screws 206. From carriage 204, a cable 205 passes around pulleys 210 and 208. A second cable 207 is wrapped around pulley 192. Cables 205 and 207 are suitably tensioned by means of spring 212.

The wavelength of the radiation from the grating that passes through the exit slit of the monchromator is proportional to the sine of the mean angle between the angle of incidence and the angle of diffraction (this may be considered the rotational position of the grating). The grating drive consists of a mechanical trigonometric function generator which is driven by the chart drum shaft 194 through tape 202 and cables 205, 207. As the grating is rotated, the tape unwinds from pulley 200 at a rate proportional to the sine of the angle of rotation of the grating. Consequently, the drum position is linearly related to the wavelength appearing at the exit slit.

The foregoing relationship is achieved by means of carriage 204 which slides on parallel tracks 214 and carries a sine bar 215 positioned to remain perpendicular to its direction of travel. Scan control arm 86 carries a roller 216 which remains in contact with sine bar 215 at all times. This contact is maintained by means of a clamping bar 218 pivoted at 220 and carrying a clamping roller 222 which contacts the opposite side of sine bar 215 from roller 216. Compression between rollers 216 and 222 is maintained by means of a clamping spring 224.

It will now be apparent that the distance along scan control arm 86 from shaft 100 to roller 216 is the hypotenuse of a right triangle and the distance traveled by sine bar 215 is essentially one leg of the triangle. Thus, the distance traveled by sine bar 215 is always proportional to the sine of the angle having its apex at shaft 100.

*Filter Changer*

A filter changer 226 (FIG. 1) is included in this apparatus for properly positioning any of several suitable filters in the radiation beam to remove unwanted higher order radiation. The construction of this filter changer is shown in detail in FIGS. 6–8 and 11. A U-shaped bracket 228 is secured to base 74 by suitable screws such as screw 231. One arm of bracket 228 supports four electromagnets 230, 232, 234, 236 which are positioned at equal distances from a central rotor shaft 238 supported between the upright arms of bracket 228. Fixedly mounted on shaft 238 is a steel disc 240 which is radially magnetized. Bonded to disc 240 by a suitable adhesive are soft iron strips 242, 244 for localizing the N-S magnetic poles of disc 240. Attached to disc 240 is a filter support member 246 adapted to support four filters although only three, 49, 248, 250 are used in the disclosed embodiment.

It will be seen that in the illustrated embodiment, electromagnets 230, 234 have been energized in series but with reversed polarity so as to form a north and a south pole, each of which attracts the opposite south and north poles of disc 240. Upon de-energizing electromagnets 230, 234 and energizing 232, 236, disc 240 will rotate 90° to place another filter in position. If the polarization of 232, 236 is subsequently reversed, disc 240 will then rotate 180°.

It is understood that the term "filter" as customarily used in the optical arts and as used herein does not include a dispersion element such as a prism.

*Operation*

The operation of the apparatus of this invention is as follows:

With shaft 100 (FIG. 3) rotated to its extreme limit in one direction, magnet 114 (FIG. 5) will contact and cling to disc 96. In this position, one of gratings 54, 56 will be positioned in the collimated radiation beam from reflector 52. At the same time, cam 144 (FIG. 10) is posiitoned so that one of its two profiles 146, 148 is contacted by cam rider 142 on slit 60 at their proper openings to maintain substantially constant energy over the spectral region to be scanned.

With either of the fast or slow scan motors 184, 186 in operation, pulley 192 is caused to rotate by cable 190, turning shaft 194 and its attached chart drum 68 (FIG. 1), pulley 200, and gear 196.

As pulley 200 continues to rotate, tape 202 pulls carriage 204 (FIG. 2) along tracks 214, thus displacing sine bar 215, as for example, toward 215'. Control arm 86 thus moves toward new position 86'; being retained against sine bar 215 by means of clamping bar 218. During this normal scan period, sector wheel 124 is out of engagement with the O-ring 122 on disc 118.

As will be apparent from FIG. 3, the motion of control arm 86 is transmitted directly to the gratings via the rotation of cylindrical member 82, bracket 92, magnet 114, and table 106. The filter changer 226 is actuated by suitable switches such as 260, 261 and a cam 262 on the base of the chart drum (FIG. 12).

During the time that one grating is being so scanned, the slit program is being varied accordingly. As will be seen by reference to FIG. 10, the rotation of gear 196 is transmitted to cam 144 (rotatable on shaft 152) through gears 198, 158, 180, and 178. The gear ratio is such that only one profile (i.e. somewhat less than ½ the outline) of cam 144 contacts rider 142 and, through it, controls the position of slit control arm 140 and the associated slit mechanism.

When it is desired to change gratings to investigate a different range of frequencies, range-change motor 138 is energized. Drive cable 130 rotates sector wheel 124. The knurled edge 126 comes into engagement with O-ring 122 and rotates shaft 100 through slightly less than 180°, disengaging magnet 114 (FIGS. 3–5) from disc 96 and causing magnet 116 to contact disc 98. This causes gratings 54 and 56 to change position thereby placing a new grating in the collimated beam from reflector 52.

At the same time that motor 138 is changing gratings, it drives gear 182, which rotates gear 162 about shaft 152. Gear 162 carries with it shaft 176. The inertia of the system causes gear 160 to remain fixed. Consequently gear 178 is caused to rotate, driving gear 164 and thereby rotating cam 144 until the formerly unengaged profile is presented to cam rider 142. Thus, operation of the range-change motor 138 not only changes gratings but also changes the slit program to fit the newly selected grating.

Inspection of FIGS. 9 and 10 will disclose an additional cam 174 whose function has not yet been described. This is a slit override cam and is operated by a knob mounted on the front of the instrument which rotates integral pulley 172 by means of cable 252. With this cam, the slit openings may be enlarged beyond those provided by cam 144 whenever desired.

It will be readily appreciated that the apparatus of this invention provides many advantages and improvements over the spectrophotometric apparatus of the prior art. It is to be understood that the foregoing description is illustrative only and is not intended to be limiting. For example, the sine bar might be replaced by another suitable trigonometric function generator such as a cosecant drive to give linear frequency readout. This invention is limited only by the scope of the following claims.

I claim:

1. A spectrophotometer comprising, in combination, radiation source means; means for forming a beam of radiation from said source; a plurality of optical filter means mounted for selective positioning in said beam; monochromator entrance slit means for receiving said beam; collimator means positioned to receive and collimate the radiation from said entrance slit means; a plurality of optical grating means; selecting means for selectively, alternatively positioning each of said grating means in a scanning location to receive substantially the entire radiation beam thereupon; scanning means for rotating the selected grating through a scanning angle while positioned in said scanning location; monochromator exit slit means positioned to receive selected radiation wavelengths from each of said grating means; and detector means in the radiation from said exit slit means responsive to the intensity of the isolated wavelengths and filter changing means operatively connected to selectively position each of said filters in said beam, said filter changing means being interconnected to said selecting means.

2. The apparatus of claim 1 wherein said plurality of optical filter means are rotatably mounted.

3. The apparatus of claim 2 wherein said filter means are affixed to radially magnetized rotor means, said rotor means being positioned in proximity to a plurality of selectively magnetizable stator elements.

4. The apparatus of claim 3 wherein said rotor means comprises a magnetically permeable disc.

5. A spectrophotometer comprising in combination, radiation source means, means for forming a beam of radiation from said source, a plurality of optical filter means mounted for selective positioning in said beam to selectively suppress unwanted radiation, monochromator entrance slit means for receiving said beam, collimator means positioned to receive and collimate the radiation from said entrance slit, grating mount means, a pair of optical gratings mounted back to back on said grating mount means, said gratings being disposed parallel to each other and each being adapted to provide a different band of dispersed radiation, rotatable means for said grating mount means, said rotatable means being operable to rotate said grating mount means to selectively, alternately position said gratings to receive said collimated radiation beam, each of said gratings being mounted substantially adjacent the axis of rotation of said grating mount means, scanning means to rotate said mount means for rotating the selected grating means through a scanning angle, monochromator exit slit means positioned to receive selected radiation from each of said optical gratings, detector means in the radiation path from the exit slit means responsive to the intensity of the isolated wavelengths, filter changing means to selectively position each of said plurality of filter means in the optical path to selectively eliminate unwanted radiation, and means interconnecting said rotatable means for the grating mount, said filter changing means and said scanning means.

6. An instrument of the character described comprising, in combination, radiation source means; means for forming a beam of radiation from said source; a plurality of optical filter means mounted for selective positioning in said beam; monochromator entrance slit means for receiving said beam; collimator means positioned to receive and collimate the radiation from said entrance slit means; a plurality of optical grating means; selecting means for selectively positioning each of said grating means in a scanning location to receive substantially the entire radiation beam thereupon; scanning means for rotating the selected grating through a scanning angle while positioned in said scanning location; monochromator exit slit means positioned to receive selected radiation wavelengths from each of said grating means; and detector means in the radiation from said exit slit means responsive to the intensity of the isolated wavelengths, and filter changing means operatively connected to selectively position each of said filters in said beam, said filter changing means being interconnected with said selecting means and scanning means whereby filter selection, grating selection, and grating scanning are interoperative.

7. A spectrophotometer comprising, in combination, radiation source means; means for forming a beam of radiation from said source; a plurality of optical filter means mounted for selective positioning in said beam; entrance slit means for receiving said beam; collimator means positioned to receive and collimate the radiation from said entrance slit means; a plurality of optical grating means; selecting means for selectively positioning said grating means in a scanning position to receive said radiation beam; scanning means for turning the selected grating through a scanning angle while positioned in said scanning position; exit slit means positioned to receive selected radiation wavelengths from said plurality of grating means; detector means positioned to receive the radiation from said exit slit means responsive to the intensity of the isolated wavelengths, and filter changing means operatively connected to selectively position each of said filters in said beam, said filter changing means being interconnected to said selecting means whereby filter selection and grating selection are interoperative.

8. An instrument of the character described comprising, in combination, radiation source means; means for forming a beam of radiation from said source; a plurality of optical filter means mounted for selective positioning in said beam; monochromator entrance slit means for receiving said beam; a plurality of optical grating means; selecting means for selectively positioning each of said optical grating means in a scanning location to receive said radiation beam; scanning means for rotating the selected grating through a scanning angle while positioned in said scanning location; monochromator exit slit means positioned to receive selected radiation wavelengths from each of said grating means; detector means responsive to the intensity of the isolated wavelengths, and filter changing means operatively connected to selectively position each of said filters in said beam, said filter changing means being interconnected with said selecting means.

9. A system of the character described comprising means to provide a beam of radiant energy; a plurality of optical filter means adapted for selective positioning in said beam; monochromator entrance slit means for receiving said beam; collimator means positioned to receive and collimate the radiation from said entrance slit means; a plurality of optical grating means; selecting means for selectively, alternatively positioning each of said grating means in a scanning location to receive radiation from said beam; scanning means for turning the selected grating through a scanning angle while positioned in said scanning location; monochromator exit slit means positioned to receive selected radiation wavelengths from each of said grating means; radiation detector means in the path of radiation from said exit slit means responsive to the intensity of the isolated wavelengths, and filter changing means operatively connected to selectively position each of said filters in said beam; said filter changing means being interconnected to said selecting means.

10. An instrument of the character described comprising, in combination, radiation source means; means for forming a beam of radiation from said source; a plurality of optical filter means mounted for selective positioning in said beam; monochromator entrance slit means for receiving said beam; collimator means positioned to receive and collimate the radiation from said entrance slit means; optical grating means; scanning means for rotating the grating means through a scanning angle while positioned in said scanning location; monochromator exit slit means positioned to receive selected radiation wavelengths from said grating means; detector means in the radiation from said exit slit means responsive to the intensity of the isolated wavelengths, and filter changing means operatively connected to selectively position each of said filters in said beam, said filter changing means being interconnected with said grating scanning means whereby filter selection, and grating scanning are interoperative.

11. A spectrophotometer comprising, in combination, radiation source means; means for forming a beam of radiation from said source; a plurality of optical filter means mounted for selective positioning in said beam; entrance slit means for receiving said beam; collimator means positioned to receive and collimate the radation from said entrance slit means; a plurality of optical grating means; selecting means for selectively, positioning said grating means in a scanning position to receive said radiation beam; scanning means for turning the selected grating through a scanning angle while positioned in said scanning position; exit slit means positioned to receive selected radiation wavelengths from said plurality of grating means; detector means positioned to receive the radiation from said exit slit means responsive to the intensity of the isolated wavelengths, and filter changing means operatively connected to selectively position each of said filters in said beam, said filter changing means being interconnected to said scanning means whereby filter selection and grating scanning are interoperative.

References Cited in the file of this patent

UNITED STATES PATENTS

| | | |
|---|---|---|
| 2,404,064 | Heigle et al. | July 16, 1946 |
| 2,704,945 | May | Mar. 29, 1955 |
| 2,750,836 | Fastie | June 19, 1956 |
| 2,775,160 | Foskett et al. | Dec. 25, 1956 |
| 2,955,508 | Martin | Oct. 11, 1960 |
| 2,969,692 | Pfarrwaller | Jan. 31, 1961 |

OTHER REFERENCES

Oetjen: "A Versatile Infra-Red Spectrograph," Journal of the Optical Society of America, vol. 35, No. 12, December 1945, pages 743–754.

Tarret et al.: "Infrared Vacuum Spectrometer With Prism/Grating Double Monochromator," Journal of the Optical Society of America, vol. 49, No. 6, June 1959, pages 603–608.